(No Model.)

C. A. & O. W. HULT.
ELASTIC FRICTION GEAR.

No. 537,977. Patented Apr. 23, 1895.

Attest
Walter Davidson
James M. Speer

Inventors
Carl A. Hult
Oscar W. Hult
by Richards & Co
Attys

UNITED STATES PATENT OFFICE.

CARL ALRIK HULT AND OSCAR WALFRID HULT, OF STOCKHOLM, SWEDEN.

ELASTIC FRICTION-GEAR.

SPECIFICATION forming part of Letters Patent No. 537,977, dated April 23, 1895.

Application filed March 6, 1894. Serial No. 502,498. (No model.) Patented in Sweden August 7, 1893, No. 4,952; in France February 6, 1894, No. 236,085; in England February 14, 1894, No. 3,229, and in Norway February 20, 1894, No. 3,645.

*To all whom it may concern:*

Be it known that we, CARL ALRIK HULT and OSCAR WALFRID HULT, mechanicians, subjects of the King of Sweden and Norway, and residents of Stockholm, in the Kingdom of Sweden, have invented certain new and useful Improvements in Elastic Friction-Gear for Fast-Running Shafts, of which the following is a specification, reference being had therein to the accompanying drawings.

Patents have been granted for this invention in Sweden, No. 4,952, dated August 7, 1893; in France, No. 236,085, dated February 6, 1894; in England, No. 3,229, dated February 14, 1894, and in Norway, No. 3,645, dated February 20, 1894.

This friction gear is chiefly adapted for the driving of such shafts, rotating with high speed, as must be accurately centered, for instance shafts for centrifugal machines. The gear therefor is so arranged, that the shaft has the opportunity to center itself. This end is obtained by the use of elastic friction rings instead of toothed wheels, friction wheels or such like, the rings being somewhat compressed between the shaft and a track, on which the rings are brought to run. The rings are brought in motion by means of rollers, acting upon them from within or from without. The rollers are fixed on pins supported by a common center, placed on the shaft and rotate by means of a cog-gear or such like.

Figure 1:
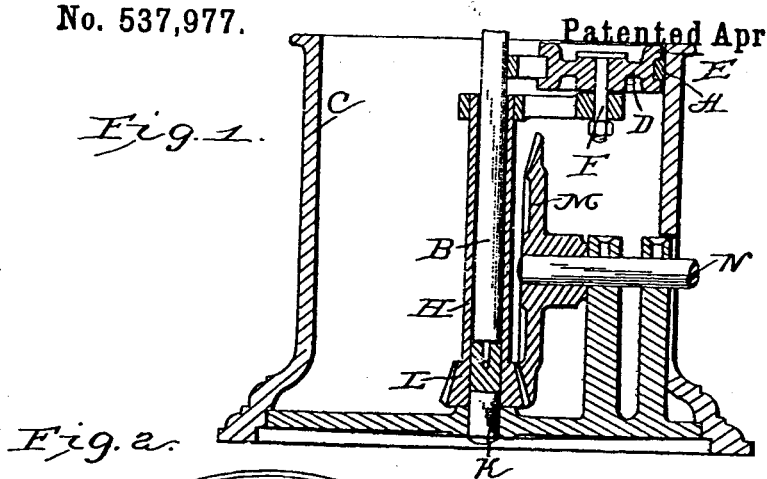
Figure 2:
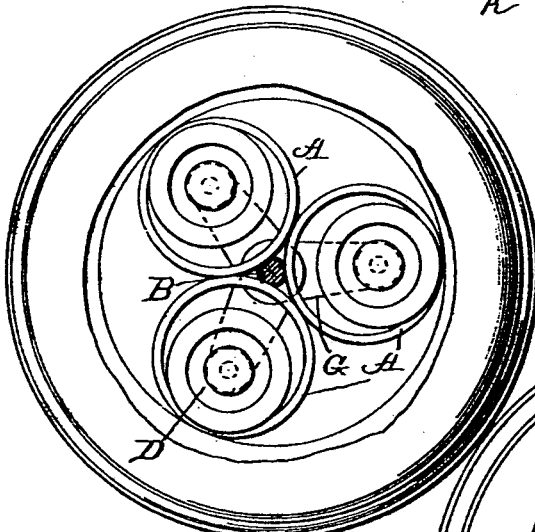
Figure 3:
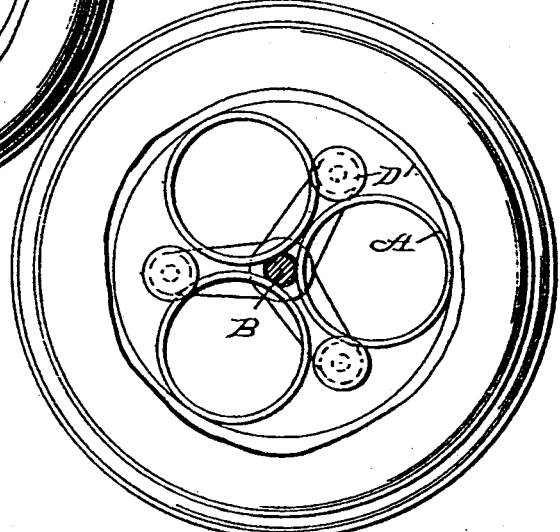

On the annexed drawings Figure 1, shows a vertical section of the driving mechanism, and Fig. 2, a plan of the same. Fig. 3, shows a modification.

The elastic friction rings are designated by A. They are placed between the shaft B to be driven and the fixed track C which, according to the drawings, forms a part of the inside of the frame. The track can evidently form a separate part, fixed to the frame. The ring consists of spring steel of the best quality and has an outer diameter, somewhat larger than the distance between the shaft and the track C, in consequence whereof the ring is somewhat compressed and acts as a real spring. The three rings thus hold the shaft in its place under a yielding pressure like a bearing. The rings are brought to run along the track C by the rollers D, acting upon the rings from within. The rollers have flanges, hugging the rings and guided by pins F, which are fixed to arms G, extending from a common sleeve shaped center revolving freely around the shaft B. At the lower end of the sleeve a pin K is inserted into the same, this pin forming a step bearing for the shaft B. The sleeve is provided with a pinion, engaging with the toothed wheel M on the driving shaft N. When this shaft is rotated, the sleeve is brought to rotate, in consequence whereof the rings run on the track C. The shaft B is put in motion by the rings. The rollers D may also be placed outside the rings, so that they drive the rings from without. This is shown in Fig. 3; also in this case, the wheels are provided with flanges, by means of which they hug the rings. The arrangement for guiding and driving the rollers is the same as described and shown in Figs. 1 and 2.

We claim—

In combination with the shaft B to be driven of the yielding rings A, which are somewhat compressed between the shaft and the track C, and rollers D, which are fixed to a common rotating center and act upon the rings, substantially as described.

In witness whereof we have hereunto signed our names in the presence of two subscribing witnesses.

CARL ALRIK HULT.
OSCAR WALFRID HULT.

Witnesses:
ERNST SVANGIRST,
CARL TH. SUNDHOLM.